United States Patent [19]

Malinowski

[11] 4,362,679
[45] Dec. 7, 1982

[54] METHOD OF CASTING CONCRETE

[76] Inventor: Roman Malinowski, Svealiden 3 D, 431 39 Mölndal, Sweden

[21] Appl. No.: 154,391

[22] PCT Filed: Dec. 28, 1978

[86] PCT No.: PCT/SE78/00107
  § 371 Date: Sep. 4, 1979
  § 102(e) Date: Sep. 4, 1979

[87] PCT Pub. No.: WO79/00473
  PCT Pub. Date: Jul. 26, 1979

[30] Foreign Application Priority Data

Jan. 3, 1978 [SE] Sweden .................. 7800077

[51] Int. Cl.³ ............................................. C04B 15/14
[52] U.S. Cl. ................................... 264/82; 106/102; 106/117; 264/87; 264/101
[58] Field of Search .................. 264/82, 87, 101, 102; 106/102, 117, 118, 121

[56] References Cited

U.S. PATENT DOCUMENTS

| | | | |
|---|---|---|---|
| 109,669 | 11/1870 | Rowland | 106/118 |
| 128,980 | 7/1872 | Rowland | 264/82 |
| 591,168 | 10/1897 | Heinzerling | 264/83 |
| 1,874,974 | 8/1932 | Hammenecker | 264/82 |
| 2,046,867 | 7/1936 | Billner | 264/87 |
| 2,496,895 | 2/1950 | Staley | 264/133 |
| 2,547,323 | 4/1951 | Heuer | 264/82 |
| 2,877,499 | 3/1959 | Wilkinson | 264/82 |
| 3,149,986 | 9/1964 | Zelmanoff | 106/118 |
| 3,305,613 | 2/1967 | Spence | 264/82 |
| 3,306,961 | 2/1967 | Spence | 264/82 |
| 3,468,993 | 9/1969 | Bierlich | 264/43 |
| 3,492,385 | 1/1970 | Simunic | 264/234 |
| 3,839,521 | 10/1974 | Robinson | 264/82 |

FOREIGN PATENT DOCUMENTS

| | | |
|---|---|---|
| 1915563 | 10/1970 | Fed. Rep. of Germany . |
| 2008247 | 9/1971 | Fed. Rep. of Germany . |
| 459673 | 1/1937 | United Kingdom . |
| 781328 | 8/1957 | United Kingdom . |
| 870054 | 6/1961 | United Kingdom . |
| 1460284 | 12/1976 | United Kingdom . |

*Primary Examiner*—Donald E. Czaja
*Assistant Examiner*—W. Thompson
*Attorney, Agent, or Firm*—Sughrue, Mion, Zinn, Macpeak & Seas

[57] ABSTRACT

In a method of casting different types of concrete products without the need of using a curing chamber or an autoclave the concrete subsequent to mixing, is casted and externally and/or internally subjected to a vacuum treatment to have it de-watered and compacted. Then carbon-dioxide gas is supplied to the mass while maintaining a sub- or under-pressure in a manner such that the gas—as a result of the sub-pressure—diffuses into the capillaries formed in the concrete mass, to quickly harden the mass. In one embodiment (cf. FIG. 2)—in which the mass (1) is de-watered and compacted by means of a mat or plate (2) placed thereupon and exposed to a sub-pressure via a pipe or a line (5)—the carbon-dioxide gas is supplied (through line 6) via said mat or plate (2) while using the under-pressure prevailing in the mass. In another embodiment (cf. FIG. 3) the sub-pressure is applied (via line 5) from one or more sides (2b) of the mould to the interior of the element being cast, either by means of special inserts, by holes or cavities inside the element or via a porous material layer (1b) in the inner portion thereof. Then the carbon-dioxide gas is supplied correspondingly (via line 6). These two main embodiments may in certain cases be combined in different ways. Further the concrete may at the same time or subsequently be subjected to another type of treatment such as impregnation by a suitable solution.

15 Claims, 3 Drawing Figures

METHOD OF CASTING CONCRETE

The present invention relates to a method of casting and rapidly curing concrete without the need of using a special curing chamber or autoclave, based on such binders as Portland cement, slag, lime, magnesium oxide, waterglass and the like. However, the method can also be used when casting other types of concrete products such as sandwich elements.

Concrete normally hardens within 7 to 28 days, unless measures are taken to accelerate the hardening process, in which case the time for the concrete to harden normally can be reduced to 4 to 16 hours. A number of accelerated curing processes based on heating the concrete at production of concrete elements, either in moulds or after remoulding, are known.

Autoclaving, i.e. high pressure steam curing, is another method of accelerating the hardening process. This process, however, requires the provision of expensive equipment and also consumes high-levels of energy. A much older, since antiquity applied process of hardening of plaster, mortars, and concretes, based on slaked lime, is carbonation, a natural process, in which the binder calcium hydroxide is transformed into calcium carbonate by absorbing carbon-dioxide from the atmosphere. The process, however, is slow and the resultant mechanical strength of the product is generally low.

A more recent development is the concept to speed-up the carbonation process of lime or lime cement mortar by means of a treatment with artificially produced carbon-dioxide. The procedure is used for drying lime plaster in residential building by applying exhaust gas containing carbon-dioxide.

The same principle in which exhaust gas is combined with steam or with moist warm air is used for accelerated hardening of different concrete products in curing chambers. This method is used in particular for hardening concrete blocks, and is in reality a combination of carbonation and hydration hardening. It has been possible to achieve hardening times of from 8 to 16 hours by means of this method. In addition to accelerating the hardening process, the gaseous mixture applied also greatly reduces shrinkage of the product.

Artificial carbonation of a concrete mass in order to accelerate hardening has been described in many U.S. patent specifications since 1870. In the U.S. Pat. No. 109,669 of 1870 to Rowland there is described a method of hardening concrete elements by means of carbonic acid gas, while in the U.S. Pat. No. 128,980 of 1872 the same inventor is using a carbonation procedure in which gas is dissolved in the mixture water-concrete.

Since then a multiplicity of methods have been proposed for the carbonation of lime and cement concrete masses and asbestos cement products (U.S. Pat. Nos. 2,496,895; 3,149,986; 3,468,993; 3,492,385). These patent specifications have claims which are directed to the composition of concrete to the compaction methods and the conditions of carbonation performed generally in chambers or on conveyors without application of vacuum. The first-mentioned application of vacuum evacuation of concrete products before carbonation applied in chambers is found in U.S. Pat. No. 591,168 of 1897. According to this specification the concrete elements are placed in a hermetically sealed vessel, to which a gas, e.g. carbon-dioxide or steam, is fed subsequent to exhausting the vessel of air. After being hardened, the concrete elements may additionally be impregnated; this latter step is also carried out in vacuo.

In UK Pat. No. 1,460,284 of 1976, German lay-open print No. 1,915,563 of 1974, and German open-to-public print No. 2,008,247 of 1971 there are described different methods of carbonation hardening of concrete, and glass fibre reinforced concrete also using vacuum treatment. The elements are moulded, placed in a special chamber or autoclave and vacuum treated before the carbonation. High strength is obtained at a carbonation time not exceeding four hours. The procedure is similar to that one described in U.S. Pat. No. 591,168 mentioned above. A carbonation procedure also applying vacuum treatment for producing shaped articles of bounded granular material is described in UK Pat. No. 781,328 of 1957. The carbonation procedure and the beneficial influence of the vacuum evaporation is generally acknowledged. Recently, the problem of the accelerated carbonation hardening has been the subject of many scientific works in which the physical and chemical basis of carbonation has been analysed in detail and the main parameters of carbonation studied. Nevertheless, the existing methods, using vacuum and carbonation, seem to be limited to production in laboratory conditions, probably because of the relative complexity and high cost of the equipment, i.e. special chambers or pressure vessels needed for the purpose.

The present invention provides a method in which many types of concrete can be carbonated. Furthermore, it is possible to treat with carbon-dioxide concrete elements or structures cast on a building site without requiring the use of autoclaves or special curing chambers. In accordance with the invention the carbonation-hardening process is combined either with the well-known vacuum de-watering and compacting method developed and patented by K. P. Billner, or is combined with a vacuum treatment applied to the concrete element internally by using special inserts, or applied via a porous internal section being a part of a concrete element.

The "vacuum-concrete" method of Billner is described in Swedish Pat. No. 89,121, published in 1935, as well as in the U.S. Pat. No. 2,046,867 of 1936 cf the same inventor. By placing on the exposed surface of the cast concrete a soft mat or rigid plate connected to a source of sub-pressure (normally a vacuum pump), there is created between the mat or plate and the opposing surface of the concrete mass a sub-pressure, while the atmospheric pressure is simultaneously compressing the concrete by means of the same mat or plate, resulting in de-watering and compaction of the concrete mass. The mat or plate is equipped with a special filtration and drainage system. The method enables workable concrete mixes of higher fluidity to be used and is applied mainly in casting horizontal construction elements, such as floors, slabs on building sites and in factories.

The present invention is characterized by combining the above described vacuum de-watering procedure with the subsequently following carbonation performed by means of almost the same equipment as used for the vacuum de-watering.

The invention is based on findings that by means of the afore-mentioned methods of vacuum de-watering and compaction, a capillary system is formed, and internal pressures and moisture conditions are created, such that carbon-dioxide gas can be introduced thereinto in a much more effective manner than was previously possible by using a chamber or an autoclave.

Thus, the invention relates to a method of casting concrete based on a hydraulic binding agent, such as Portland cement, slag, lime, magnesium oxide or waterglass or the like, in which the concrete is cast and shaped subsequent to mixing the ingredients of said concrete, whereafter the mass is treated in vacuo, i.e. de-watered and compacted, either externally by subjecting at least one of the sides of said mass to an under-pressure, or by means of the internal vacuum treatment, the method being mainly characterised by the fact that carbon-dioxide gas is charged into the mass whilst maintaining said under-pressure in a manner such as a result of said under-pressure the gas will diffuse through the capillaries formed in the concrete mass, thereby to accelerate the hardening process. Thus, the invention is characterised by the fact that the vacuum de-watering and compaction of concrete, and the carbonation of said mass, for forming the internal structure thereof and hardening said mass are performed with one and the same equipment, substantially continuously.

A preferred method of the invention, in which the concrete is dehydrated with the use of a mat or plate positioned on said mass, which mat or plate is connected to a sub-pressure source through a connecting line, is characterised in that subsequent to creating the afore-mentioned sub-pressure conditions in said mass, the connection to said source is disconnected and carbon-dioxide gas is introduced into said mass via said mat or plate, whilst utilizing the prevailing sub-pressure in said mass.

Thus, it is possible in practice to utilize a simple two-way shut-off valve, so arranged that, when dehydration of the mass is completed, it can be switched over so that carbon-dioxide gas can be supplied to the surface of the concrete mass through said mat or plate, said gas rapidly finding its way into the capillaries of the mass as a result of the sub-pressure prevailing therein. The scheme of the procedure based on external vacuum carbonation treatment is presented more in detail below.

Generally, the sub-pressure conditions are created in the concrete mass from only one side thereof and are successfully applied for thin elements, although it is also possible to connect several sides of a cast element to said vacuum source. Such procedure intensifies the carbonation and is useful when casting thicker elements.

The carbonation can also be performed by using the internal vacuum treatment with special vacuum inserts placed in the interior of the element or via specially designed holes or cavities or via a porous layer of a material in the internal part of the element, comprising concrete, brick, stone or glass wool, plastic or the like. The carbon-dioxide is supplied to the concrete in the same way as described above. In this way hollow or sandwich elements for concrete walls, beams, roofs, etc. can be produced. In this procedure the concrete is either de-watered (when using the vacuum inserts) or evacuated when the element consists of a porous layer. A dry mix is used in this method. An example of this procedure is given below. This procedure can be combined with the one mentioned before, in which two or more sides of the element are vacuum-carbonated. Columns or walls can be produced in this way. To intensify the carbonation many variations can be applied, for example of the continuous or repeated procedure. The continuous process is performed at maintained vacuum applied from one or two sides of an element when applying the external carbonation method, or from the internal part when using vacuum inserts or the like, while the carbon-dioxide which is supplied from the opposite side (to the vacuum treated surface) penetrates the concrete mass.

The sub-atmospheric pressure to which the concrete mass is subjected may be between 0.1 and 0.95 kp/cm$^2$, while the pressure of the carbon-dioxide gas may be from 0.01 to 0.5 kp/cm$^2$ above atmospheric pressure.

The pressure of the carbon-dioxide gas can be regulated during supply to the element in such a way that the resulting pressure in the concrete does not exceed the atmospheric one. This finding was proved experimentally and can be explained by the chemical nature of the carbonation reaction, in which the high absorption of the carbon-dioxide is followed by creating of under-pressure in the material due to the chemical contraction.

In the carbonation process either pure carbon-dioxide or waste carbon-dioxide having different concentration of $CO_2$ or a combined $CO_2$ with steam or hot humid air may be used.

The used components and the mix proportions, especially the water cement ratio, influence highly the carbonation process.

The water-cement ratio of the concrete mass prior to the de-watering thereof shall be between 0.1-1, preferably between 0.3 and 0.5. A low water-cement ratio promotes the formation of smaller capillaries and thereby facilitates the penetration of the carbon-dioxide gas into the mass.

Certain advantages can be obtained by adding different admixtures such as water-reducing, plasticizing or air entraining and other admixtures influencing the solubility of $Ca(OH)_2$ and the speed of the carbonation or hydration processes, and added either in liquid or in particle shape, and additives such as finely-ground limestone, magnesium carbonate and silicium, to the fresh concrete mass when mixing the same.

By using said substances, particularly certain organic substances, the capillary structure can be improved, thus affecting the speed of the carbonation process.

Finely-ground natural carbonates added to the concrete improve the bond to the newly formed calcium carbonates and results in greater mechanical strength of the concrete as hardening continues.

When applying the method according to the invention in practice, calcium carbonates etc. are formed as a result of a rapid reaction between carbon-dioxide and the calcium hydroxide, calcium silicates of the cement and other salts of the fresh mix, and the concrete will harden within some few minutes. 30 to 90% of the final mechanical strength of the concrete can be obtained after only 15 minutes. At the same time there is generated a relatively high temperature, in the range of from 40° to 90° C., which in turn accelerates the initial hydration of calcium silicates and the hardening of the concrete mass.

Tests have confirmed that the combined vacuum-carbonation procedure is much more effective than the carbonation of remoulded elements performed at the same conditions but treated in a pressure vessel. Higher temperature and velocity of the reaction and higher initial and later age strength are thus obtained. Other qualities are those of increased density, impermeability, diminished shrinkage and increased durability. Furthermore are to be mentioned that the curing time can be regulated to take place between a few minutes and a few hours, and a final product having predetermined properties can be obtained. A workable concrete can be used for casting of thin layers and can be smoothed out by surface-vibration only. The ability of the concrete to flow can be improved by adding superplasticizers to the mix. A simple, cheap and handy equipment, which can be used not only in a factory but also on a building site is accomplished. The low, regulatable gas pressure and a relatively small space for the gas supply into the hermetically sealed mould means that the working conditions are favourable from the aspect of labour protection.

In summing up, the method according to the invention (a) enables the concrete to be cured very quickly, (b) provides a concrete with a high mechanical strength and low shrinkage and permeability, and (c) results in a cured concrete being highly resistant to efflorescence and action of chemical forces.

Additionally, the vacuum treatment and the subsequent carbonation to which a concrete mass is subjected also contribute towards reducing the amount of moisture in an erected building.

As a special procedure one or more sides of the concrete element may be surface-impregnated upon the carbonation process by adding—at maintained sub-pressure—a liquid of inorganic or of organic nature, such as natrium (sodium), potassium, or fluor silicate, or of a monomer or polymer or other viscous substance. Said liquid will be sucked into the capillar capillary structure and seal off the surface of the element.

When required, the afore-described process and equipment may in certain cases be used to carbonate a previously partially hydrated and cured concrete, thereby to complete the curing of said concrete. This may be an advantage in the case, for example, of mechanically planed and partially hardened floor surfaces. Further the shrinkage of the concrete can be diminished in this way. The surface of the concrete can in such a case be ground and polished at a stage in which the hardness of the surface is of a proper magnitude for the mentioned operations.

The method according to the invention is particularly useful in the manufacture of relatively thin concrete layers and thin concrete products, hollow elements, especially when a uniform hardening in a whole section of the cast product is required. In certain cases, however, all that is required, or desired, is the quick formation of a relatively thin supporting layer or a strong outer layer of the concrete mass, for example for early removal of moulds in vertically casted walls. In such a case the method according to the invention can afford important advantages.

The method according to the invention can be used in structures which are cast on the building site, or in prefabrication plants for manufacture of different types of elements and concrete products made of conventional or lightweight aggregate and special concrete, for example fibre-reinforced.

As examples of on-site cast structures mention can be made of concrete floors for residential and industrial buildings, concrete walls, pavements, road and airport surfaces, bridge decks and others, cast in one or more layers simultaneously or on previously hardened floors. The method can also be used for repairing damaged structures, especially when the speed of the repair is important.

As examples of concrete products which can be manufactured by means of the method according to the invention mention can be made of roofing tiles, drainage pipes, non-reinforced and reinforced thin elements, lightweight and hollow concrete blocks for walls, slabs for pavements and garden paths, facade slabs, "tilt-up" wall elements, of a sandwich type, and the like.

A method of carrying out the invention will now be described with reference to the accompanying schematic drawing, in which.

Figure 1:
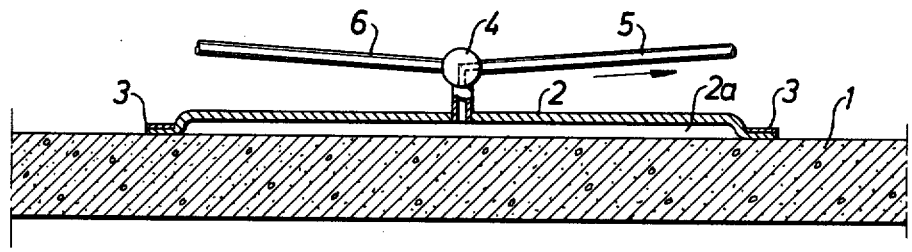
FIG. 1 is a vertical section through a concrete slab during vacuum treatment, i.e. external treatment, said Figure illustrating the equipment used therefor.
Figure 2:
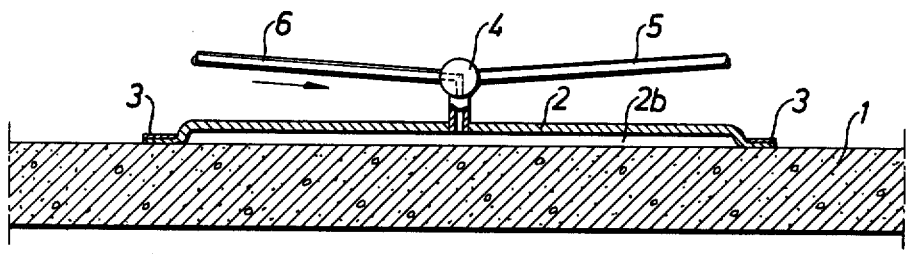
FIG. 2 is a sectional view corresponding to that of FIG. 1 in which the equipment is used for the carbonation process following said vacuum treatment.

In FIGS. 1 and 2 the numeral 1 identifies a concrete mass, which may have been formed in a mould (not shown) and which is subjected to vacuum treatment, i.e. de-watered and compacted, by means of a mat or plate 2 placed on the concrete mass, the mat or plate 2 being connected to a vacuum source (not shown) through a line 5. Between the upper surface of the concrete layer and the mat or plate 2 there is formed a space 2a which in the de-watering step can be termed a sub-pressure chamber. The vacuum causes the removal of water from the concrete mass by suction, while the atmospheric pressure acting against the concrete layer is contributing to compacting the concrete. Extending around the edge of the mat or plate are seals 3 which abut the concrete layer.

The vacuum chamber 2a is connected with the line 5 extending to the sub-pressure source (not shown) through a two-way valve 4, the valve in the FIG. 1 embodiment being set to a position in which a line 6 communicating with a carbon-dioxide container (not shown) is closed.

The vacuum treatment of the concrete mass can be continued for a period of e.g. 10 minutes, whereafter the valve 4 is switched over to the position shown in FIG. 2. In this position of the valve, the connection with the vacuum source is broken and the connection with the carbon-dioxide container (not shown) is opened instead, through the line 6. As a result of the sub-pressure still prevailing in the mass, carbon-dioxide gas will diffuse into the capillaries formed in the concrete mass, to cause a rapid hardening of the mass through carbonation. Thus, in this step of the procedure the chamber located between the mat or plate 2 and the concrete mass can be termed a carbonation chamber, as identified by the reference 2b in FIG. 2.

As a result of the rapid reaction between carbon-dioxide, calcium-hydroxide, magnesium calcium-hydroxide and other salts, lime carbonates, etc. are formed and the concrete will harden within some few minutes. At the same time, a high temperature, in the order of magnitude of 60°–90° C., is generated, which accelerates the initial hydration of calcium silicates and continued hardening of the concrete mass.

Thus, the apparatus illustrated in FIGS. 1 and 2 is used both for the vacuum treatment process and the carbonation process, there being used a simple two-way valve 4 for switching between the two processes.

Figure 3:
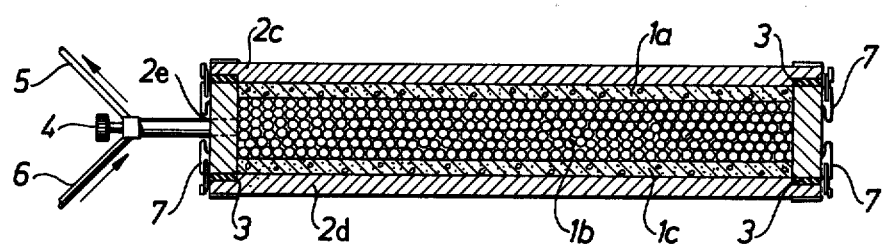
FIG. 3 is a sectional view illustrating vacuum treatment and carbonation of a sandwich element applied internally.

Another example of vacuum treatment and carbonation is shown in FIG. 3. A three-layer concrete element of sandwich-type comprising a bottom layer 1c of a compact or dense concrete, a porous middle layer 1b and an upper compact layer 1a are poured into a mould having a bottom 2d and sides 2e. An upper mould part 2c covers the upper layer 1a. The mould is hermetically sealed by means of packings 3 and clamps 7. After the vacuum treatment via pipe 5 the valve 4 is turned and carbon-dioxide is supplied through pipe 6. The middle layer may comprise holes or cavities in the element, porous concrete or light-ballast-concrete from porous brick, plastic, stone or glass-wool or the like. Together with the upper and bottom layers 1a, 1c a sandwich-element is formed. In this way different types of sandwich-elements such as reinforced wall elements, beams, roof elements etc. can be produced.

In the embodiments according to FIGS. 1 or 2 a liquid in the form of a monomer or a polymer or other viscous substance may be added after the carbonation process at maintained sub-pressure. The liquid will then be sucked into the capillary structure and impregnate the surface of the element.

A number of examples of elements which can be manufactured by means of the method according to the invention and the mixtures used in said manufacture are given below.

EXAMPLE 1

Fluid concrete for floors, 3.5 cm thick.
Mixing proportions in percent by weight
Cement: 1
Aggregate 0–8: 4.5
Water: 0.4
Admixture: 1% (to the cement)

The mass was subjected to vacuum treatment for 10 minutes and to carbon-dioxide treatment for 10 minutes. After half an hour the mass was found to have a mechanical strength of 10 MPa.

EXAMPLE 2

Lightweight aggregate concrete plate, 4 cm thick, mixing proportions by weight in percent.
Cement: 1
Sand 0–2 mm: 1.0
Lightweight ballast 0.5–8 mm: 1.25
Water: 0.5
Admixture: 0.5% (to cement)

The mass was subjected to vacuum treatment for 10 minutes and to carbon-dioxide treatment for 10 minutes. After standing for half an hour the mass was found to have a mechanical strength of 7 MPa.

EXAMPLE 3

Mosaic plates, $30 \times 30 \times 2.5$ cm, placed and vacuum treated in a mould $300 \times 90 \times 25$ cm, and then treated with carbon-dioxide for 10 minutes. Weight proportions.
Cement: 1
Ground lime stone 0–0.5 mm: 1.5
Dolomite stone: 2.5
Water: 0.3
Admixture: 1% (to cement)

After standing for half an hour the mass was found to have a compressive strength of 30 MPa.

EXAMPLE 4

Concrete hollow block, $100 \times 70 \times 15$ cm of non-fine concrete.
Cement: 150 kg/m$^3$
Fine sand: 100 kg/m$^3$
Coarse aggregate 4–8 mm: 1200 kg/m$^3$
Water: 80 l/m$^3$
Admixture: 1%

Curing conditions as in example 1 and 2. Compressive strength after ½ hour 3 MPa.

EXAMPLE 5

Concrete hollow block, $100 \times 70 \times 15$ cm, of non-fine lightweight aggregate concrete.
Cement: 170 kg/m$^3$
Fine sand: 80 kg/m$^3$
Lightweight aggregate 4–8 mm: 500 kg/m$^3$
Water: 120 l/m$^3$
Admixture: 1%

Curing conditions as in examples 1 and 2. Compressive strength after ½ hour 2 MPa.

EXAMPLE 6

Sandwich element $240 \times 60 \times 24$ cm, made of two external layers of mortar 2 cm thick of a mixture according to example 1 and of an internal non-fine concrete 20 cm thick made of the mixture according to example 4. Curing as in the examples 1 and 2.

EXAMPLE 7

Sandwich element, $240 \times 60 \times 24$ cm, made of two external layers of lightweight aggregate mortar 2 cm thick of a mixture according to example 2 and an internal non-fine lightweight aggregate concrete of a mixture according to example 5. Curing as in the examples 1 and 2.

I claim:

1. A method of carbonation-hardening a concrete mass, which has already been formed, without using a special curing chamber or autoclave comprising the steps of:
   subjecting the formed mass to a vacuum under a hermetic seal simultaneously to dewater the mass and to compact the mass by the action of atmospheric pressure, thereby creating in the mass a capillary system under pressure; and
   thereafter, directly introducing carbon dioxide gas into the mass and simultaneously releasing the vacuum, whereby the pressure is removed so that the gas is efficiently and autogenously absorbed into the mass quickly to harden the mass.

2. A method according to claim 1, in which the vacuum is applied to an external surface of the mass via a vacuum mat hermetically sealed to the surface and connected to a source of vacuum through a line, characterised by disconnecting said source and simultaneously supplying carbon-dioxide gas to the mass via said line and mat whilst utilizing the partial vacuum prevailing in said mass to draw said gas into said mass in a direction opposite to that in which the water is removed by the vacuum.

3. A method according to claim 1, characterised by applying the vacuum, and supplying the gas, to at least two external surfaces of the mass.

4. A method according to claims 1 or 2, characterised by providing an internal portion of the mass with passageways; and applying the vacuum, and supplying the gas, via said passageways to said internal portion.

5. A method according to claim 1, characterised by applying the vacuum to one surface of said mass, and supplying the carbon-dioxide gas to a different surface of said mass.

6. A method according to claim 2, characterised by repeating said vacuum applying and gas supplying steps while the vaccum mat is left in position on the surface of said mass.

7. A method according to claims 1, 2, 3, 5 or 6, characterised by subjecting the concrete mass to a subatmospheric pressure of 0.1–0.95 kp/cm$^2$ and subsequently supplying the carbon-dioxide gas to said mass at a pressure which exceeds atmospheric pressure by 0.01–0.5 kp/cm$^2$.

8. A method according to claims 2 or 6, characterised by regulating the pressure of the carbon-dioxide gas, supplied to the concrete after the vacuum treatment thereof, in such a way that the pressure under the mat does not exceed the atmospheric pressure.

9. A method according to claims 1 or 2, characterised by supplying the gas combined with steam or hot humid air.

10. A method according to claims 1 or 2, wherein the concrete mass has a water-cement ratio of 0.1–1 prior to subjecting the mass to the vacuum.

11. A method according to claims 1 or 2, characterised by using concrete mixed with substances of an organic, or inorganic, or mixed nature, or carbonated water, said substances affecting the structure formation and properties of carbonated concrete.

12. A method according to claims 1 or 2, wherein the concrete mass has an initial temperature of 30°–90° C.

13. A method according to claims 1 or 2, characterised by impregnating one or more surfaces of the concrete mass by, after the gas supplying step, again subjecting the mass to a vacuum, and supplying to the mass a solution of sodium-, potassium- or fluor-silicate, or polymer or another organic or inorganic or mixed viscous substance so that said solution is sucked into the capillary structure, resulting in increased density, strength, and durability of the mass.

14. A method according to claims 1 or 2, wherein the mass is previously partially hydrated and hardened concrete.

15. A method according to claim 10 wherein said ratio is 0.3–0.5.

* * * * *